Figure 1:
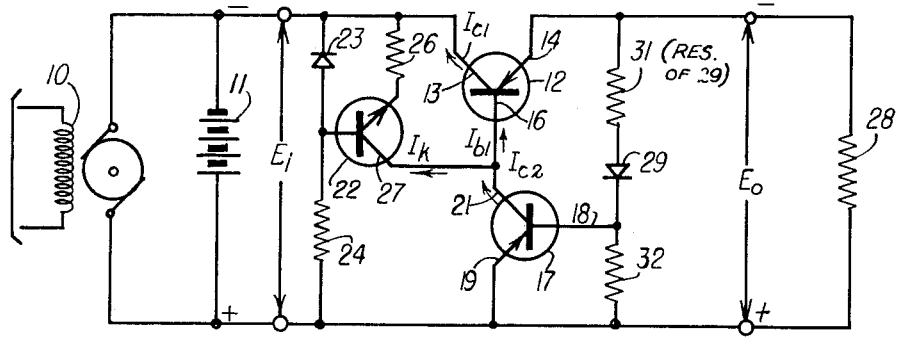

Dec. 18, 1962  R. D. MOHLER  3,069,617
VOLTAGE REGULATED POWER SUPPLY
Filed Aug. 1, 1958

INVENTOR.
Robert D. Mohler
BY Mueller & Aichele
Attys.

United States Patent Office 3,069,617
Patented Dec. 18, 1962

3,069,617
VOLTAGE REGULATED POWER SUPPLY
Robert D. Mohler, Glen Ellyn, Ill., assignor to Motorola, Inc., Chicago, Ill., a corporation of Illinois
Filed Aug. 1, 1958, Ser. No. 752,513
5 Claims. (Cl. 323—22)

This invention relates to voltage regulators and voltage regulated power supplies and more particularly to direct current voltage regulators employing transistors as control elements.

In many applications it is desired to provide a constant voltage for the operation of various electrical equipments from a direct current source of fluctuating voltage such as a current generator or a bridge rectifier. In the past, various electronic systems have been proposed to achieve this result. Because of their long life and compact size as compared with vacuum tubes, transistors are particularly desirable as control elements in voltage regulators particularly those of the type included in vehicles. However, because of variations in transistor electrical characteristics with changes in temperature, voltage regulator systems employing transistors have not been entirely satisfactory, particularly when included in systems subject to a substantial variation in ambient temperature.

Voltage regulators often employ voltage reference elements such as Zener diodes. In order that the reference voltage of the system be constant, it is desirable that the regulator be operative with the smallest possible variable current passing through the reference element. A regulator responsive to small current signals is particularly desirable since high level currents may cause an internal temperature rise in the transistors serving as control elements and change their operating characteristics. Further, a system responsive only to relatively large current signals will not be particularly sensitive to voltage changes nor provide effective regulating action.

It is an object of this invention, therefore, to provide a sensitive and effective transistorized voltage regulator.

It is another object of the invention to provide a voltage regulator capable of controlling output voltage in response to a relatively small voltage and current signal indicative of deviation from a standard output voltage.

It is a further object of the invention to provide a transistorized voltage regulator which is stabilized against variations in ambient temperatures.

A feature of the present invention is the provision in a voltage regulator of a shunt connected comparison transistor and a series connected control transistor connected so that a deviation in output voltage appears as the base current of the comparison transistor and is amplified to appear as the base current of the control transistor to be amplified further as a signal tending to restore the output voltage to a predetermined value.

Another feature of the invention is the provision of a regulator having a reverse-biased Zener diode connected in series with the forward-biased emitter junction of a comparison transistor, with the diode and emitter junctions having matched temperature characteristics in order to stabilize the electrical characteristics of the system against variations in ambient temperature.

A further feature of the invention is the provision of a regulator having a constant current source in series with the base of a control transistor which in turn is connected to a comparison transistor, so that the amplified output signal from the comparison transistor which reflects deviations in output voltage of the system will be fully reflected as the input signal in the control transistor.

Yet another feature of the invention is the provision of a resistance of predetermined magnitude in the base-emitter circuit of a comparison transistor in the aforesaid voltage regulator, with the resistance selected to compensate for variations in collector current of the transistor with changes in the potential between the base and emitter thereof.

Figure 2:
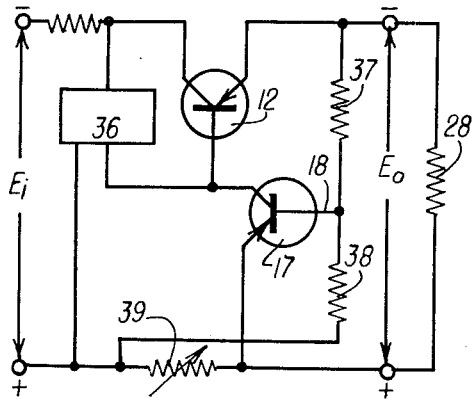
Figure 3:
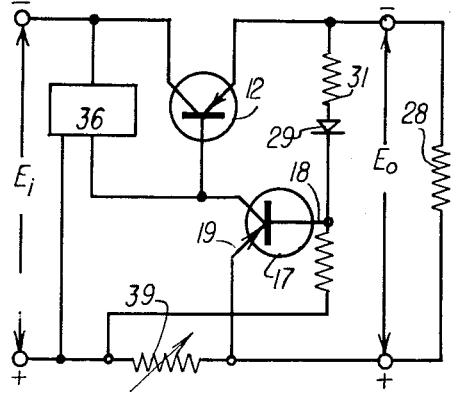
Figure 4:
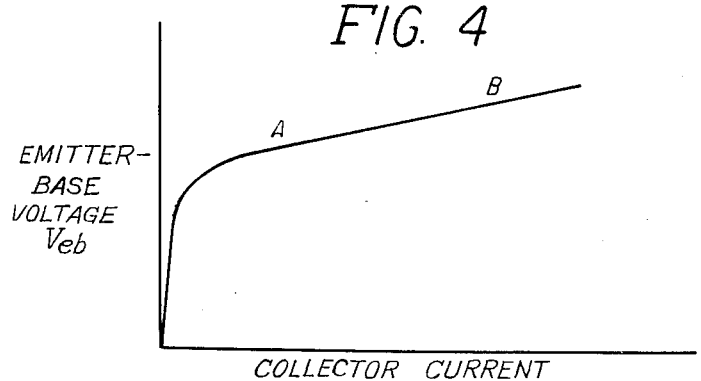

In the accompanying drawings:
FIG. 1 is a schematic circuit diagram showing one form of voltage regulator in accordance with the present invention;
FIG. 2 is a circuit diagram showing another embodiment of the invention;
FIG. 3 is a circuit diagram of still another embodiment of the invention; and
FIG. 4 is a graph showing the relation between collector current and emitter to base voltage in a typical transistor.

In accordance with the invention, a regulator system is provided having a comparison transistor which is connected with its base and emitter terminals across a portion of the output voltage of a circuit. A control transistor of the same type has its base connected to the collector of the comparison transistor and its emitter and collector connected in series with an unregulated voltage source. Any change in output voltage or deviation from a reference is thus reflected as an input signal in the comparison transistor, the amplified output of which becomes the input of the control transistor, and which is further amplified to produce a signal in a direction tending to restore the output voltage to its original value. A constant current source is connected to the base of the control transistor so that the deviation detected by the comparison transistor is fully reflected to the control transistor. The circuit may be stabilized against variations with ambient temperature by providing a voltage reference diode of equal and opposite temperature characteristics as compared with the emitter junction of the comparison transistor. Regulation of the output voltage within a narrow range may be achieved by providing a predetermined resistance in the base-emitter circuit of the comparison transistor to compensate for variations in collector current with voltage drop across the emitter-base connection.

FIG. 1 illustrates one embodiment of the invention which shows the voltage regulator system attached to a source of direct current input voltage $E_i$ illustrated as a generator 10 and a battery 11. A series control transistor 12 (PNP) includes collector 13 and emitter 14 connected in series with the input voltage source and also includes base electrode 16. A comparison transistor 17 (also PNP) provided with base electrode 18, emitter electrode 19 and collector electrode 21 is connected with its collector connected to the base 16 of the transistor 12. A constant current source made up of NPN transistor 22, diode 23, and resistors 24 and 25 is connected to the input voltage $E_i$, with the collector electrode 27 of transistor 22 being connected to base 16 of transistor 12. A constant current is provided through the collector 27. The polarity of the output voltage of the system may be reversed by substituting NPN transistors for the PNP units and vice-versa.

A variable load resistance indicated at 28 is connected across the output of the system and is supplied with output voltage $E_o$. Zener diode 29, biased in the reverse direction, is connected in between one side of the load 28 and the base 18 of transistor 17. Resistor 32 is connected in series with the diode 29 to provide bias for the same.

In operation of the circuit shown in FIG. 1, a decrease in $E_o$ due to a change either in $E_i$ or in the load resistance 28 produce a change in the voltage between the base and emitter of comparison transistor 17 and a change in the base current of that transistor. The Zener diode 29 has a breakdown voltage slightly less than the regulated value of the output voltage and serves to provide a reference potential so that substantially the entire change of output voltage is reflected as an input signal or drop in the voltage appearing across the base-emitter connection of transistor 17. This results in a drop in the base current which causes a decrease in the collector current of transistor 17 designated at $I_{c2}$. Because the constant current source provides a constant current $I_k$, the sum of $I_{c2}$ and the base current in control transistor 12, designated as $I_{b1}$, is equal to a constant. Therefore, the decrease in $I_{c2}$ results in a corresponding increase in $I_{b1}$. The increase in base current in the control transistor results in an increase in its collector current $I_{c1}$ which causes increased current to flow through the load resistor 28 tending to restore output voltage $E_0$ to its original value.

Some of the advantages of a series voltage regulator of the character described and illustrated are:

(a) The deviation between output voltage and reference voltage across diode 29 as amplified by the gain of the comparison transistor 17 is further amplified by control transistor 12 so that the maximum corrective response of the two transistors is obtained.

(b) The current gain of the transistor 17 allows a smaller current flowing through the internal resistance 31 of the diode 29 to give good voltage regulation. This permits stable operation of the diode to produce a constant reference voltage because the voltage drop across the internal resistance is kept low.

(c) Output voltage is stabilized against temperature variation by providing the emitter junction 19 of transistor 17 of temperature coefficient complementary to the rectifying junction of diode 29 i.e., the characteristics of both junctions change by the same amount for a given temperature change but in opposite directions. Thus, any changes in emitter to base voltage due to temperature variations would be compensated for by corresponding changes in the opposite direction in the voltage drop across the diode 29. Thus, the input signal to the transistor 17 will be a function only of the deviation of $E_0$ from the reference voltage and will not be affected by temperature.

In operating the regulator shown in FIG. 1 to produce a constant output voltage of 6.3 volts, the components of the following values were used:

| | |
|---|---|
| Transistor 12 | 2N277. |
| Transistor 17 | 2N176. |
| Transistor 22 | 2N144. |
| Diode 23 | "Transitron" SG-22. |
| Resistor 24 | 1000 ohms. |
| Resistor 26 | 5 ohms. |
| $I_k$ | −40 milliamperes. |
| Diode 29 | 6.1 volt Zener diode type 652C3. |
| Resistor 31 | 10 ohms. |
| Resistor 32 | 100 ohms. |

Although the voltage regulator shown in FIG. 1 is generally satisfactory for controlling output voltages, certain small uncontrolled changes will result because of certain operating characteristics of transistor 17. FIG. 4 is a graph of the collector current ($I_c$) plotted against emitter-base voltage ($V_{eb}$) of a typical alloy junction transistor. Even in the straight-line operating region of transistor between the points A and B, $V_{eb}$ tends to decrease with a decrease in $I_c$. Thus, in operation of the circuit shown in FIG. 1, a decrease in $I_{c2}$ caused by a decrease in the base current through transistor 17 resulting from a drop in output voltage would result in a corresponding small drop in the base to emitter voltage. This drop is additive to the overall drop in output voltage $E_0$ and results in a lowering of output voltage which is uncompensated.

FIG. 2 illustrates another embodiment of the invention wherein transistors 12 and 17 are connected as in the previously illustrated embodiment to a constant current source indicated generally at 36 which corresponds to the constant current circuitry, including transistor 22, of FIG. 1. A part of the output voltage is delivered to the base 18 of comparison transistor 17 from a voltage divider made up of resistors 37 and 38. A variable resistor 39 is included in the base emitter circuit of the comparison transistor as a regenerative feedback element. The inclusion of the resistor 39 in the circuit permits a degree of regulation satisfactory for some applications to be obtained without employing a Zener diode as a reference element. The resistance 39 is so chosen that it provides a voltage drop equal to the decrease in base-emitter voltage caused by the decrease in the collector current of the transistor. This has the effect of producing a constant output voltage across the load 28 as the current through the load is varied.

Typical values of components in circuit of the type shown in FIG. 2 to achieve satisfactory voltage regulation and provide compensation of the type described are as follows:

| | |
|---|---|
| Transistor 12 | 2N176. |
| Transistor 17 | 2N176. |
| Constant current from source 36 | −40 milliamperes. |
| Resistor 37 | 100 ohms. |
| Resistor 38 | 35 ohms. |
| Resistor 39 | 0.1 ohms. |

The use of voltage divider as shown in FIG. 2 has the disadvantage of magnifying changes in the emitter-base voltage of transistor 17 and reflecting them across the output voltage. For this reason, it may be desirable to provide a reverse biased Zener diode 29 of the type shown in FIG. 1 to serve as a reference voltage. The circuit incorporating such a diode in conjunction with the compensating feedback resistance is shown in FIG. 3. It will be understood that the diode 29 shown in FIG. 3 has a rectifying junction of equal and opposite temperature characteristics as the emitter juncion 19 of the comparison transistor 17 so that the temperature compensation is provided in the manner previously described in addition to the compensation provided by the feedback resistor 39.

The present invention thus embodies a voltage regulating system which requires but infrequent replacement of its components and is compact because it employs transistors as control elements. At the same time, the use, as a reference voltage, of a Zener diode having a junction of temperature characteristics corresponding to the emitter junction of one of the transistors holds the system stable against temperature variations. The provision of the adjustable feedback resistor provides means of regulating output voltage within close limits in compensating for the gain characteristics of the comparison transistor employed. Because the comparison and control transistors are connected so that the voltage deviation is detected as an input signal across the emitter-base connections of the comparison transistor only, the signal receives the maximum amount of amplification in being converted to a compensating current by the control transistor. This permits the regulator to control output voltage accurately and stabilizes the system because of the low currents carried by the control elements.

I claim:

1. A voltage regulated power supply including in combination, direct current potential supply means, output load terminals, a control transistor having collector and emitter electrodes connected in series between said supply means and said load terminals and having a base electrode, a comparison transistor having base and emitter electrodes connected to said load terminals and having a collector electrode, means coupled to said comparison transistor whereby a change in voltage across said load changes the base current in said comparison transistor substantially proportionally to said change, and a constant current source including a further transistor having an output electrode connected to said base electrode of said control transistor and input electrodes interconnected with biasing means to said potential supply means, said collector electrode of said comparison transistor being connected to said base electrode of said control transistor so that said constant current source and the last mentioned base electrode carry current of said collector electrode of said comparison transistor and so that the current in said base electrode of said control transistor varies inversely with the voltage across said load and the current change in said collector electrode of said control transistor compensates for the voltage change across said load.

2. A voltage regulated power supply including in combination, a source of direct current potential, a load connected across said source, a comparison transistor connected to said load, a Zener diode and resistor network connected between said load and the base of said comparison transistor, said diode biased in the reverse direction and serving as a reference potential so that a change in voltage across said load changes the base current in said comparison transistor proportionally to said change, said comparison transistor having an emitter junction biased in the forward direction and having substantially complementary temperature characteristics as compared with said diode, a resistor serially connected with said load and coupled between the base-emitter circuit of said comparison transistor to provide a potential difference tending to compensate for change in base-emitter voltage of said comparison transistor due to changes in collector current thereof, a control transistor with its base connected to the collector of said comparison transistor and connected with its collector and emitter in series between said source and said load with the base current in said control transistor controlling the collector current thereof to substantially neutralize changes in voltage across said load and a constant current source including a further transistor biased by said source of direct current potential and connected to the base of said control transistor and to the collector of said comparison transistor.

3. An electronic regulator circuit including in combination, direct current potential supply means, output load conductors, a control transistor having first and second electrodes connected in series between said supply means and one of said load conductors, said control transistor further having an input electrode, a comparison transistor having input electrodes and having an output electrode connected to said input electrode of said control transistor, voltage divider circuit means coupled across said output load conductors and connected to said input electrodes of said comparison transistor so that a change in voltage across said load conductors is reflected as a change in current through said output electrode of said comparison transistor, and a constant current circuit including a further transistor having an output electrode connected to said input electrode of said control transistor and further having input electrodes, circuit means providing a bias potential for said input electrodes of said further transistor, whereby a change in current through said comparison transistor is translated to said control transistor for regulating the direct current potential applied to said output load conductors.

4. An electronic regulator circuit including in combination, direct current potential supply means, output load conductors, a control transistor having first and second electrodes connected in series between said supply means and one of said load conductors, said control transistor further having an input electrode, a comparison transistor having input electrodes and having an output electrode connected to said input electrode of said control transistor, voltage divider circuit means including a first portion coupled across said output load conductors and a second portion series coupled between said potential supply means and one of said load conductors, means connecting said input electrodes of said comparison transistor to said voltage divider circuit means with said second portion thereof providing positive feedback so that a change in voltage across said load conductors is reflected as a change in current through said output electrode of said comparison transistor, and a constant current circuit including a further transistor having an output electrode connected to said input electrode of said control transistor and further having input electrodes, circuit means providing a bias potential for said input electrodes of said further transistor, whereby a change in current through said comparison transistor is translated to said control transistor for regulating the direct current potential applied to said output load conductors.

5. An electronic regulator circuit including in combination, direct current potential supply means, output conductors to be connected to an electrical load, a control transistor having emitter and collector electrodes connected between said supply means and one of said load conductors, said control transistor further having a base electrode, a first resistor series coupled between said potential supply means and one of said load conductors to conduct load current, a voltage divider comprising only resistor means connected between the other of said load conductors and the side of said first resistor nearest said potential supply means, a comparison transistor having an output electrode connected to said base electrode of said control transistor, a constant current source including a further transistor connected to said output electrode and across said potential supply means, said comparison transistor having input electrodes connected between the other side of said first resistor and a portion of said voltage divider, with said first resistor providing regenerative feedback in said regulator so that a change in voltage across said load conductors is reflected as a change in current through said output electrode of said comparison transistor and said base electrode of said control transistor for changing the conduction of said control transistor and regulating the direct current potential applied to said output load terminal.

References Cited in the file of this patent

UNITED STATES PATENTS

| | | |
|---|---|---|
| 2,693,568 | Chase | Nov. 2, 1954 |
| 2,850,695 | Bishop | Sept. 2, 1958 |
| 2,896,151 | Zelinka | July 21, 1959 |

FOREIGN PATENTS

| | | |
|---|---|---|
| 1,129,336 | France | Sept. 3, 1956 |

OTHER REFERENCES

"Designing Transistor Circuits, D.C. Regulators," R. B. Hurley, Electronic Equipment, April, 1957, pp. 20–23.